(12) United States Patent
Buffet

(10) Patent No.: US 8,845,469 B2
(45) Date of Patent: Sep. 30, 2014

(54) HIGH EFFICIENCY HYBRID VEHICLE WITH TWO PLANETARY GEAR MECHANISMS FOR POWER DERIVATION

(76) Inventor: Denis Ernest Celestin Buffet, Paris (FR)

( * ) Notice: Subject to any disclaimer, the term of this patent is extended or adjusted under 35 U.S.C. 154(b) by 303 days.

(21) Appl. No.: 13/118,662

(22) Filed: May 31, 2011

(65) Prior Publication Data

US 2012/0309574 A1    Dec. 6, 2012

(51) Int. Cl.
| | |
|---|---|
| *F16H 3/56* | (2006.01) |
| *F16H 3/72* | (2006.01) |
| *F16H 37/06* | (2006.01) |
| *B60K 6/387* | (2007.10) |
| *B60K 6/445* | (2007.10) |
| *F16H 37/08* | (2006.01) |

(52) U.S. Cl.
CPC ............ *B60K 6/445* (2013.01); *B60K 6/387* (2013.01); *F16H 2200/2007* (2013.01); *F16H 3/727* (2013.01); *Y02T 10/6239* (2013.01); *F16H 2037/088* (2013.01)
USPC ................................... 475/5; 475/151

(58) Field of Classification Search
USPC .................... 475/5, 149–152, 330
See application file for complete search history.

(56) References Cited

U.S. PATENT DOCUMENTS

| 7,575,529 | B2 * | 8/2009 | Holmes | 475/5 |
|---|---|---|---|---|
| 7,753,816 | B2 * | 7/2010 | Chachra et al. | 475/5 |
| 7,972,237 | B2 * | 7/2011 | Ota | 475/5 |
| 2004/0058769 | A1 * | 3/2004 | Larkin | 475/5 |
| 2007/0072724 | A1 * | 3/2007 | Raghavan et al. | 475/5 |
| 2012/0035014 | A1 * | 2/2012 | Moeller | 475/5 |

* cited by examiner

*Primary Examiner* — Jacob S Scott

(57) ABSTRACT

A power transmitting system for hybrid vehicle with first and second planetary gear mechanisms of different ratios used for power derivation: a first planetary gear mechanism (4) dedicated to low vehicle speeds and the second planetary gear mechanism dedicated (5) to the high vehicle speeds. The planetary gear mechanisms are driven in parallel by a thermal engine (1) and by an electric motor (2). The planetary gear mechanisms drive, in parallel, a differential gear (6) connected to wheels (9). Pilot shafts of the planetary gear mechanisms (4) and (5) alternatively connect and disconnect to an electric generator (3) which regulates the driving force of the vehicle by controlling resistive torque through a clutch (7). Advantages of the system include improved efficiency, reduced cost, regenerative braking and power input from an electrical grid.

7 Claims, 6 Drawing Sheets

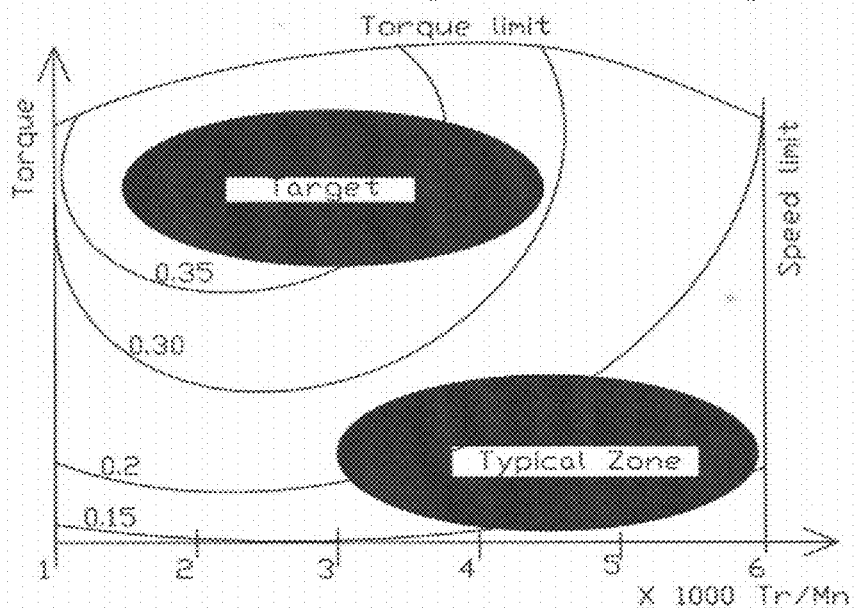
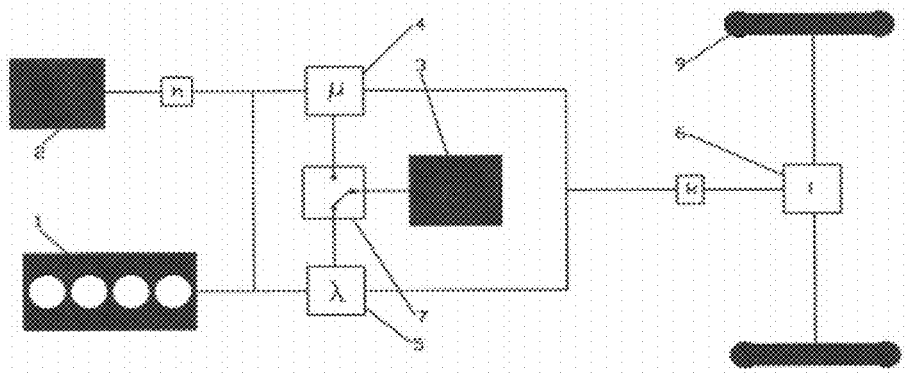

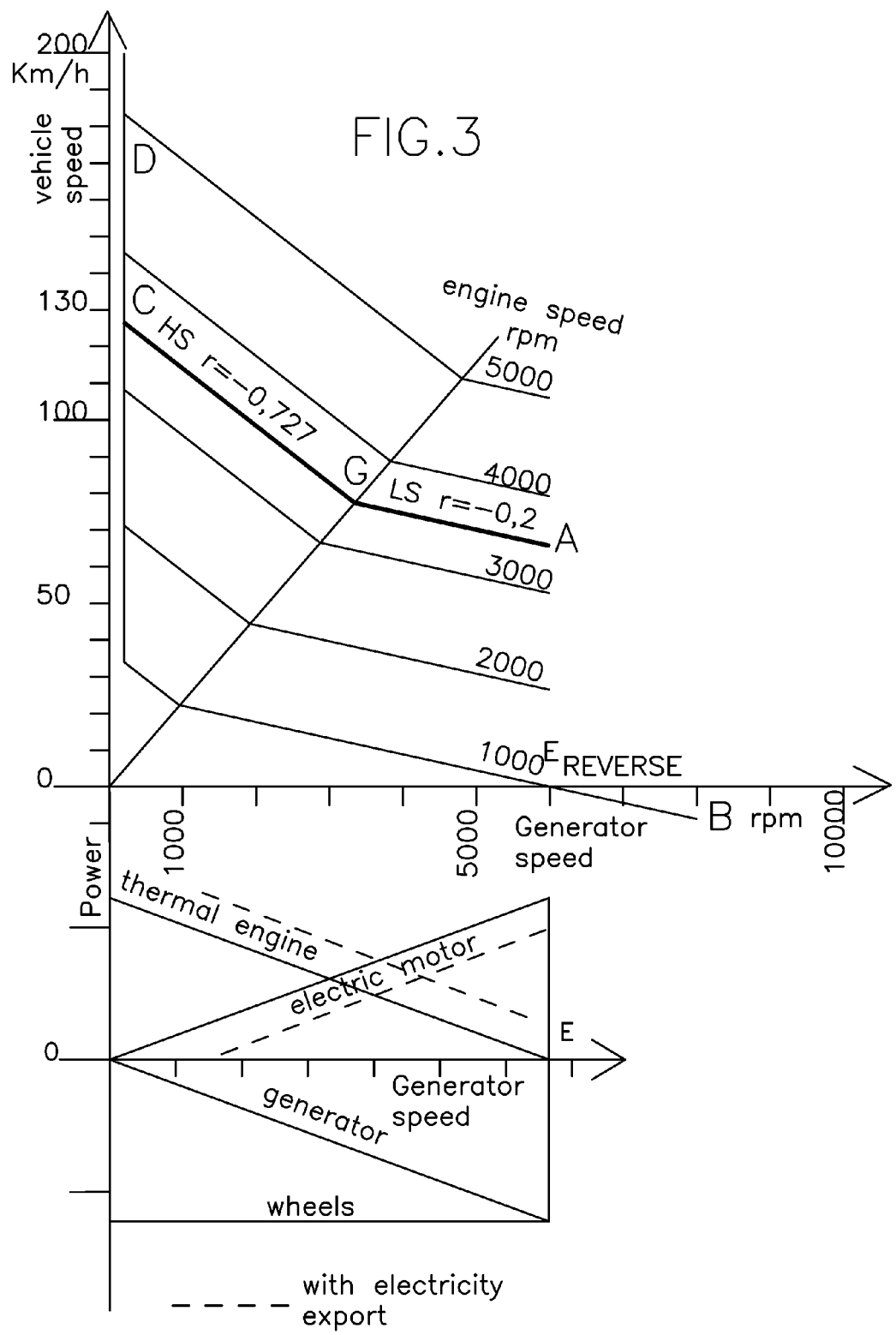

HIGH EFFICIENCY HYBRID VEHICLE WITH TWO PLANETARY GEAR MECHANISMS FOR POWER DERIVATION

BACKGROUND OF THE INVENTION

The present invention relates to the improvement of hybrid vehicles, i.e. vehicles associating electric and thermal drive, when the end purpose of dual drive is to increase the energy efficiency. It more particularly relates to vehicles built around planetary gear mechanisms known as of "power derivation" or "power distribution", when they are used as the power distribution integration system. This last is very useful to manage the power distribution between the electric and the thermal sources. They should not be confused with planetary gear mechanisms used for power transmitting system from an input shaft to an output shaft. These last, known as of "power transmission", have a typical arrangement with one of their three shafts blocked in rotation to their fixed casing. They are generally used as rotation speed adaptors between two shafts and can be replaced by gears, chains, belts and so on . . .

For instance, the patents WO 2006/098249 A1, US 2010/262322 A1, WO 2007/093882 A2, WO 2005/118322, WO 2005/118322 A1, US 2009/314565 A1 describe directly or indirectly such vehicles based on one power distribution integration system which can be a planetary gear mechanism of "power derivation" type as their preferred mode of realization. They may also use some planetary gear mechanisms of the second type to adapt the rotation speeds of shafts but their function and their arrangement are quite different so they should not be confused with the first type.

In the following text, we only consider planetary gear mechanisms of "power derivation" type. In addition, out of their three shafts, the shaft which has the controlled torque is the pilot shaft. To simplify the talk, "the pinion gear" means "the pinion gear itself and its symmetrical or its counterparts which have the same function in the planetary gear mechanism.

The improvement of the efficiency of current hybrid vehicles is based on three main ideas, namely:
  to make the thermal engine runs at its optimal torque and rotation speed regarding its efficiency,
  to recover the kinetic energy of the vehicle during its deceleration,
  to turn off the thermal engine during period when the vehicle is at a standstill.

The first main idea is founded on the observation of the ISO efficiency chart for a thermal engine which shows a better efficiency at high torque and slow rotation speed for the same output power. The insertion in the power transmitting system of a planetary gear mechanism associated with a means to import or to export electric energy makes it possible to adjust the operating torque and rotation speed of the thermal engine in order to keep them in the optimal efficiency zone. The device according to the present invention uses this known technique but, as we will see, it draws much more benefit from it.

Hence, in a typical hybrid vehicle, a large part of the mechanical energy is transformed into electric energy in a generator and then stored in a battery. Later this energy is restored and reconverted in mechanical energy in an electric motor according to the power requirements of the vehicle. These successive energy transformations have an efficiency of about 80% for the best equipment and provided that the main part of the energy does not go through the battery stage. This efficiency naturally affects the global efficiency of the vehicle. Whereas the highest efficiency of a thermal engine is 35%, the efficiency of a hybrid vehicle reaches a maximum of 25%. It is thus beneficial to minimize the relative quantity of mechanical energy transformed into electricity which is then degraded in the successive transformations. We will see how the present invention minimizes the quantity of electricity generated and especially the quantity stored in the battery.

The Willis formula related to planetary gear mechanism shows that the rotation speed of the output shaft depends of the rotation speed of the pilot shaft, i.e. the third shaft of the planetary gear mechanism, and the rotation speed of the input shaft. The graph is a straight line having the gear ratio for directing coefficient, therefore for "slope". This straight line is the "characteristic" of the planetary gear mechanism. On startup of the vehicle, the electric motor provides all the power. To obtain the maximum torque, the "characteristic" must be as horizontal as possible, the horizontal one being the direction of the axis of the pilot shaft speed. This is important because the startup torque dimensions the power of the whole electric chain. Conversely, the "characteristic" must be as vertical as possible in order to reach high vehicle speeds, the vertical one being the direction of the axis of the output shaft speed. These two criteria are contradictory and in general lead to a compromise prejudicial to the efficiency and to the power of the electric equipment's. We will see how the device according to the present invention circumvents this compromise.

To reach high vehicle speeds, the current hybrid vehicles may have to extend the useful field of their "characteristic" by reversing the rotation direction of the pilot shaft. This inversion happens at usual speeds on highway whereas the needs for power are important and while the efficiency around this point is poor. We will see later why the present invention does not have to reverse the direction of the pilot shaft to reach high vehicle speeds.

Current hybrid vehicles must increase their electric autonomy and find additional power from an electric source at high vehicle speed. Consequently they need huge electric storages and that for long runs, this means big batteries. We will see why the present invention avoids these difficulties.

BRIEF SUMMARY OF THE INVENTION

The hybrid vehicle according to the present invention mitigates the here above drawbacks:
  by alternatively using two planetary gear mechanisms of different ratios, one adapted to low vehicle speeds, the other one to high vehicle speeds. Of course, we will see how the device can continuously and smoothly change of the one to the other.
  by a specific architecture of its power transmitting system characterized by the thermal engine which drives the two planetary gear mechanisms of different ratios for power derivation, themselves driving in parallel the differential gear of the axle and which the pilot shafts are alternatively connected and disconnected to the electric generator through the clutch.
  by an original management of the electric energy produced by the generator of which the main, less the auxiliaries consumption, is immediately consumed in the electric motor, whereas the electric energy recovered from the kinetic energy of the vehicle is consumed in the following acceleration.

BRIEF SUMMARY OF THE SEVERAL VIEWS OF THE DRAWINGS

FIG. 1 shows a typical chart of the ISO efficiency for a thermal engine.

FIG. 2 schematizes the architecture of the power transmitting system of the hybrid vehicle according to the present invention in its upstream version.

FIG. 3 shows the "characteristic" of the power transmitting system at different rotation speeds of the engine according to the present invention.

DETAILED DESCRIPTION OF THE INVENTION

Figure 4:
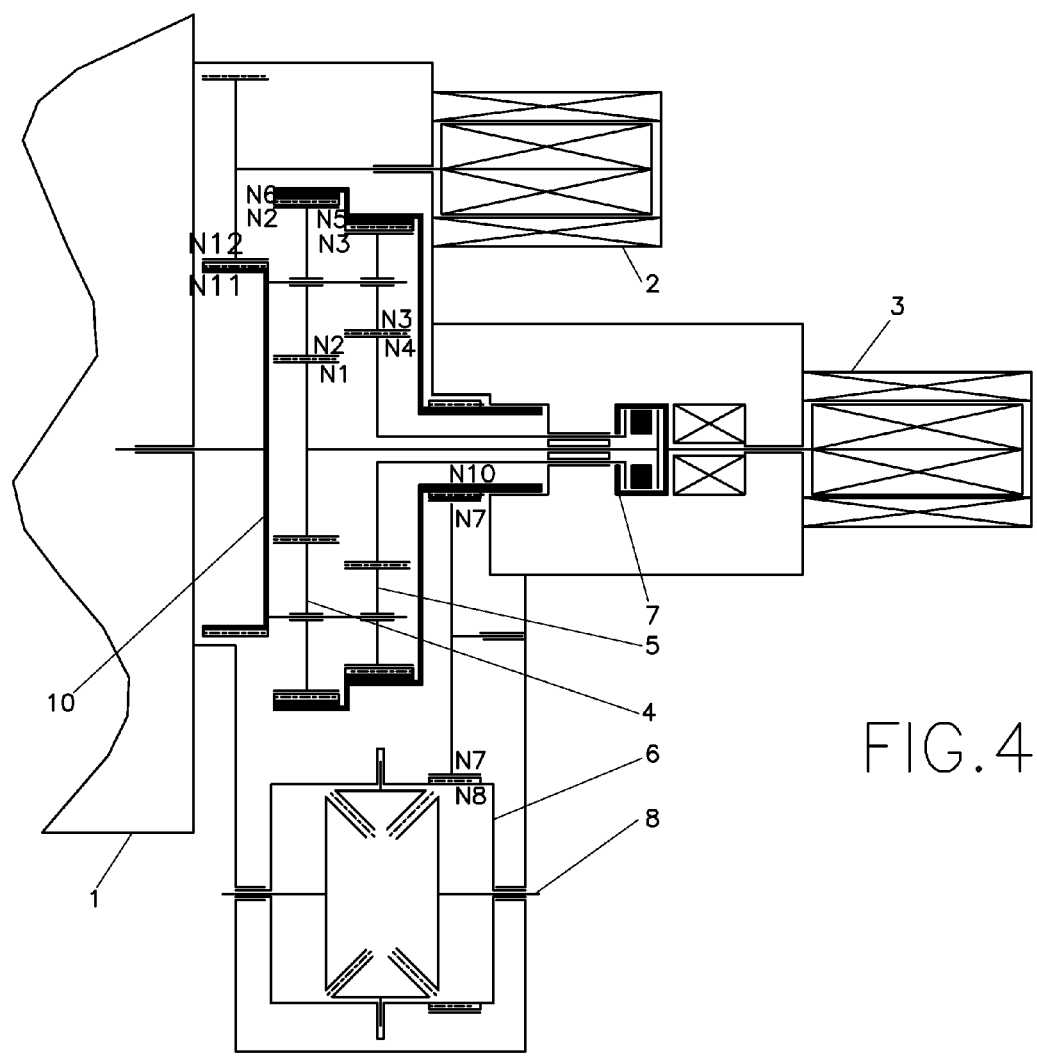
FIG. 4 shows, out of transverse section, the two planetary gear mechanisms according to the present invention in its upstream version.

To describe more in detail the power transmitting system of the vehicle according to the present invention, its architecture is built around a planetary gear mechanism dedicated to the low vehicle speeds with a ratio ranging from −0.1 to −0.5 and a planetary gear mechanism dedicated to the high vehicle speeds with a ratio ranging from −0.5 to −0.9. The planetary gear mechanism ratio being the ratio between the product of teeth numbers of the driving gears and the product of the teeth numbers of the driven gears, with the sign + if the number of external engaging is even and − in the contrary case; the sun gear of the pilot shaft being, by convention in our case, the first driving gear. These two planetary gear mechanisms are driven by the thermal engine. The two planetary gear mechanisms themselves drive the differential gear of the axle in parallel. The axle transfers the movement to the wheels, through a differential gear, in the same way than on a conventional vehicle. The pilot shafts of the two planetary gear mechanisms alternatively drive the electric generator via an electromechanical clutch which can be a multi discs type. It has the characteristic to make the permutation when the rotation speed of the pilot shaft, i.e. the generator shaft, equalizes the rotation speed of the input shaft. Indeed, for this particular rotation speed, all the "characteristics" of the planetary gear mechanisms go through this singular point whatever their ratio and consequently the rotation speeds of the pilot shafts of the two planetary gear mechanisms are thus equal. It is then easy to alternatively connect and disconnect them to the generator without jolt; especially if the torque on the generator is annihilated during the time of the permutation which is a very short time, a fraction of second. In addition some reducing or step up units may ensure the rotation speed compatibility for the electric motor, the generator and the differential gear of the axle.

The vehicle speed is controlled by the accelerator which acts on the generator current and consequently on its resistive torque then on the torque transmitted to the wheels under the proportionality rule of the torques on a planetary gear mechanism. Note that just after a permutation of the planetary gear mechanisms; the action of accelerator on the generator current is adapted to take into account the new gear ratio in order to maintain a driving force constant and to have a smooth transition. The current produced by the generator, minus the auxiliaries' consumption, is immediately consumed by the electric motor which comes to relieve the thermal engine. As we will see, the electric motor is preferably mounted upstream the planetary gear mechanism, so the torque of the thermal engine comes to be added to the torque of the electric motor so that the resulting torque remains proportional to the controlled torque of the generator. The regulation is relatively simple compare to hybrid vehicles with a downstream arrangement.

In the downstream arrangement, the electric motor is installed after the planetary gear mechanisms for driving the differential gear of the axle in parallel with them. The advantage of this configuration is that the planetary gear mechanisms do not have to stand the power of the electric recirculation which comes in addition to the thermal power. But the power of the generator cannot always be consumed in the electric motor, because the torque might become huge at low vehicle speed; this implies bigger battery and more efficiency losses. Even In this configuration the present invention eases the problem because the electric power is much lower in a double planetary gear mechanism than in a single planetary gear mechanism at low vehicle speed. So the upstream configuration is preferred mainly because the electric power can always and immediately be consumed in the electric motor due to its range of rotation speed in normal operation. In addition at low speed, vehicles require less power; power which can easily be limited by the generator controlled torque. In the following only the upstream configuration is considered.

For minimizing the battery capacity, its function is limited, to store energy for utilities, i.e. lighting, starting and so on . . . same as on ordinary vehicles and to have a reserve of capacity equivalent to the kinetic energy of the vehicle at its maximal speed. Taking into account its character of temporary reserve, only few minutes, it can advantageously be replaced by some electric capacitors. This limited capacity goes hand in hand with a rigorous management of the electric energy produced by the generator of which the main, less the auxiliaries' consumption, is immediately consumed in the electric motor, whereas the electric energy recovered from the kinetic energy of the vehicle is consumed in the following acceleration. The idea is not to store electric energy for some power deficits in some vehicle configurations as we can see in regular hybrid vehicles.

During acceleration, the torque of the electric generator and consequently the torque on the wheels are increasing, same as the thermal engine power. It is only when the vehicle drive and resistance forces are equal that the speeds are stabilized. Then the regulation seeks the best combination of torque and rotation speed for the thermal engine taking into account the global efficiency. We may have some anticipated parameters preloaded in the computer of the regulation in order to accelerate the stabilization process according to different ways of driving. Of course, the choice between the planetary gear mechanism dedicated to the low vehicle speeds and the planetary gear mechanism dedicated to the high vehicle speeds is automatic.

During soft deceleration, the operating is the same (till) until the direction of the torque on the wheels change. In the event of fast deceleration, all the torques are reversed but not the rotation directions. In these circumstances, the electric motor runs as a generator, the generator as a motor while the thermal engine opposes its antagonist torque. At this point the brake pedal gains control of the "generator" torque thus of the braking torque on the wheels. Then the mechanical brake gradually takes over when the pressure level on the brake pedal is increasing. It is only when the thermal engine approaches its minimal driving torque that the excess of electric energy coming from the vehicle kinetic energy will be directed towards the battery.

Most of hybrid vehicles save energy by using a "stop and start" procedure, i.e. to turn off the thermal engine during period when the vehicle is at a standstill. The vehicle according to the invention already has all the means to restart the thermal engine with the electric motor permanently in grip with it. It is thus enough to consider this function at the level of the control-command of the vehicle.

The battery has a limited capacity for storing the excess of electric energy. When it is full, in case of a long slope for instance, the electric energy is directed towards an armor-plated resistance immersed in the cooling liquid of the thermal engine to benefit from an existing system when this last is available and little loaded. This system is a genuine electric brake which can be installed on most hybrid vehicles. It has the advantage to be a substitute to the engine brake effect and to allow thermal engines with low antagonist torque, that is good for fuel saving.

At the first reacceleration, the accelerator pedal takes back the control of the generator torque. As we have seen the energy coming from the kinetic energy and accumulated in the battery is in priority consumed in the electric motor in order to leave some capacity for the next deceleration, while a minimum for the utilities is kept. All this strategy minimizes the quantities of electricity therefore the quantities of mechanical energy degraded in the successive transformations.

To reach usual high speed on highway, the generator does not have to change its rotation direction because of the "characteristic" of the "high speeds" planetary gear mechanism. Above the authorized speed on highway, if the rotation speed of the thermal engine is not sufficient, the regulation of the generator changes to torque regulation at low and constant rotation speed while the thermal engine is accelerating until an adequate rotation speed. At the start up, the adaptation of the "low speeds" planetary gear mechanism makes it possible to increase the torque on the wheels and thus to decrease the power of the whole electric chain.

An electronic variator-converter ensures not only the transfers of electric energy but also the control and the protection of the electric equipment's according to known technologies. Whereas typical hybrid vehicles use reversible bidirectional equipment able to change rotation and torque directions, a reversible unidirectional variator-converter is sufficient in our case because only torque direction may change.

Compared to known hybrid vehicles, the hybrid vehicle according to the invention has the following advantages: a better adaptation of the planetary gear mechanism, a smaller battery capacity; no inversion of rotation direction for, the thermal engine, the electric motor and the generator; the variator-converter can be unidirectional only; the electric equipment's are less powerful so more economic; and finally more flexibility on the torque and on the rotation speed of the thermal engine which means a better efficiency.

The vehicle according to the invention offers some specific possibilities. As we have seen, except the energy intended for utilities, the idea is not to store the surplus of electric energy on long run. Under this specificity, the battery has a modest size and get less alternate cycles of charge and discharge which are very prejudicial for its lifetime. However the vehicle can be equipped with a voluntarily oversized battery or a second battery. This battery or available capacity remains always and cheaply rechargeable on the national electric grid because, contrary to regular hybrid vehicles, it is not recharged by the vehicle generator in normal operation; therefore it is never recharged starting from its fuel. This additional and economic energy can replace some expensive and pollutant fuel. An increase of the electric motor power is even not necessary because, apart the startup and the low speeds, it is not used at its full power. There are some important savings without changing the vehicle bases. To sum up, the vehicle according to the invention has a reserve of battery capacity specifically dedicated to the recharge on the national electric grid that the vehicle generator cannot recharge in normal operation in order to be sure to get additional energy coming from the national electric grid and not from the vehicle fuel. Nevertheless the vehicle has all necessary means to recharge this battery when it is idle but that has no economic interest.

Construction makes it possible to gather the two planetary gear mechanisms in the same casing with simplifications:
  the two planetary gear mechanisms can be built up concentric with a common pinion gear carrier driven by the thermal engine,
  the two planetary gear mechanisms can have a common ring gear to drive the differential gear of the axle,
  the planetary gear mechanism of negative ratio, can be realized in the same section of gears. However for the ratios ranging from −0.7 to −0.9, it is no longer possible to insert the pinion gear between the ring gear and the sun gear. In this case, the planetary gear mechanism can be built in two sections of gears,
  the differential gear of the axle and the step-up gear for the electric motor can be installed in the same casing than the planetary gear mechanisms,
  all the pinion gears are, at least, doubled by their symmetrical to improve the dynamic balancing and the mechanical resistance.
  a first gearing can be inserted between the thermal engine and the first planetary gear mechanism in order to reduce the rotation speed of their driving shafts.
  a last gearing can be inserted between the clutch and the generator in order to adapt the rotation speed of the pilot shafts.
  the transmission units between the planetary gear mechanisms and the electric motor and between the planetary gear mechanisms and the differential gear of the axle can be of different types: gears, chains, belts, shafts and so on . . .

By way of a nonrestrictive example, to illustrate the vehicle according to the present invention, we have chosen:
  Vehicle mass: 1000 Kg,
  Thermal Engine: 53 KW at 4000 rpm, 1000-5000 rpm,
  Electric motor and generator: 17 KW, 0-7000 rpm, 70 mN, 400V
  Wheel development: 1.98 m,
  Gears: $N1=19, N2=38, N3=19, N4=101, N5=139, N6=95, N7=46, N8=19, N9=45, N10=21$,
Under these conditions:
  Battery: 0.5 KWh+0.2 KWh capacitor,
  Ratio of the "low speeds" planetary gear mechanism: −0.2,
  Ratio of the "high speeds" planetary gear mechanism: −0.727,
  Ratio of the differential gear of the axle: 0.193,
  Ratio of the electric motor step up gear: 1.59,
  Maximum vehicle driving force: at start up: 2196 N, with the "low speeds" planetary gear mechanism: 1052 N, with "high speeds" planetary gear mechanism: 1566 N,
  Power derivation system efficiency: 80-90%

The FIG. 1 graphically shows the typical ISO efficiency curves of a thermal engine in order to illustrate the basis of the efficiency improvement in hybrid vehicles. Indeed, to import and to export electric energy make it possible to shift the torque and the rotation speed of the thermal engine, from the "typical zone" with low efficiency towards the "target zone" with a better fuel efficiency.

The FIG. 2 schematizes the architecture of the power transmitting system of the hybrid vehicle with two planetary gear mechanisms (4) and (5) for power derivation according to the present invention in its upstream version. The thermal engine (1) and the electric motor (2) drive in parallel the two planetary gear mechanisms (4) and (5) which themselves drive in parallel the axle of the wheels (9) via the differential gear (6). The pilot shafts of the two planetary gear mechanisms (4) and (5) are alternatively connected and disconnected to the generator (3) through the clutch (7). The reducer gears (h) and (k) ensure the compatibility of the rotation speeds in the power transmitting system.

The FIG. 3 in its upper part, graphically represents the "characteristics" of the vehicle speeds in relation to the generator rotation speeds at different thermal engine rotation speeds according to the present invention. The GA segment is the "characteristic" of the "low speeds" planetary gear mechanism of ratio −0.2, the GC segment is the "characteristic" of the "high speeds" planetary gear mechanism of ratio −0.727, the CD segment is the "characteristic" when the generator controls the torque at low constant rotation speed, the EB segment represents the vehicle reverse running when the generator rotation speed exceeds the E point. The FIG. 3, in its lower part, represents the driving power from the electric and thermal sources at 1000 rpm engine speed compare to the driving power on the wheels.

The FIG. 4 shows, out of transverse section, the two planetary gear mechanisms with the planetary gear mechanism (λ) (4) dedicated to the low speeds and the planetary gear mechanism (μ) (5) dedicated to the high speeds of the vehicle according to the present invention. The planetary gear mechanism (4) is composed of the free pinion gear (N2) on the pinion gear carrier (10) driven by the thermal engine (1), of the ring gear (N6) driving the differential gear (6) of the axle via the gear (N7) and of the sun gear (N1) alternatively connected with the generator (3) through the clutch (7). The planetary gear mechanism (5) is composed of the free pinion gear (N3) on the pinion gear carrier (10) driven by the thermal engine (1), of a ring gear (N5) driving the differential gear (6) of the (axel) axle via the gear (N7) and of the sun gear (N4) alternatively connected with the generator (3) through the clutch (7). The pinion gear carrier (10) driven by the thermal engine (1) is also driven by the electric motor (2) through the step up gear (N11) and (N12). The differential gear (6) of the axle is driven by the common ring gear (N5) and (N6) of the planetary gear (4) and (5) via the reducer gear (N10), (N7) and (N8). The pinion gears (11) and (12) are the symmetrical or the counterparts of the pinion gears N2 and N3 for a better balancing. The differential gear of the axle (6) drives the articulated joints (8) and the axle which is not represented.

Figure 5:
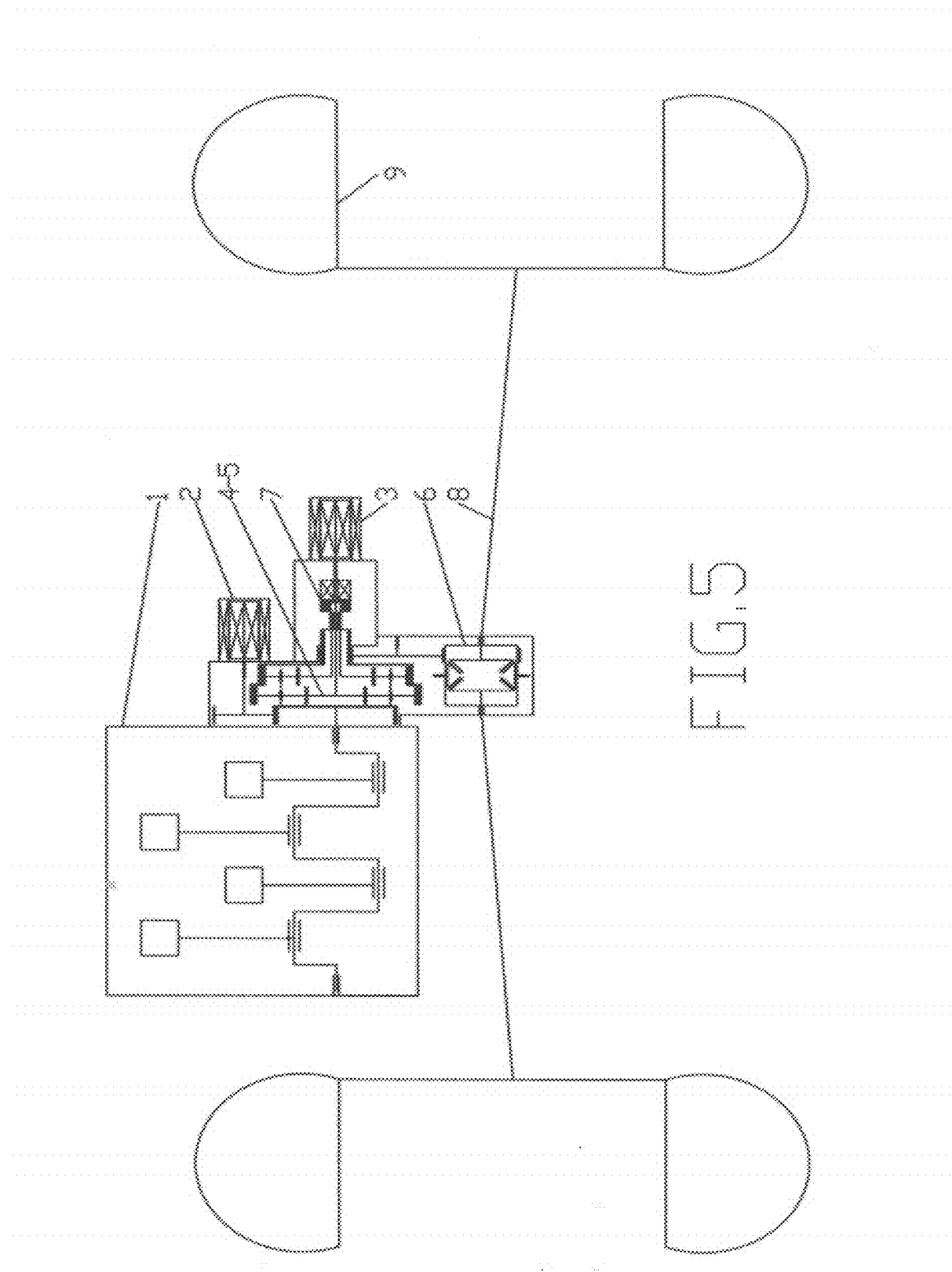
FIG. 5 shows out of transverse section, the integration of the driving block inside the vehicle according to the present invention.

The FIG. 5, out of transverse section, shows the integration in the vehicle of the driving block organized in successive sections with the thermal engine (1), the planetary gear mechanisms (4) and (5), the differential gear (6) of the (axle) axle (8), the clutch (7), the electric motor (2) and finally the generator (3), the whole forming the driving block between the wheels (9) of the vehicle according to the present invention.

Figure 6:
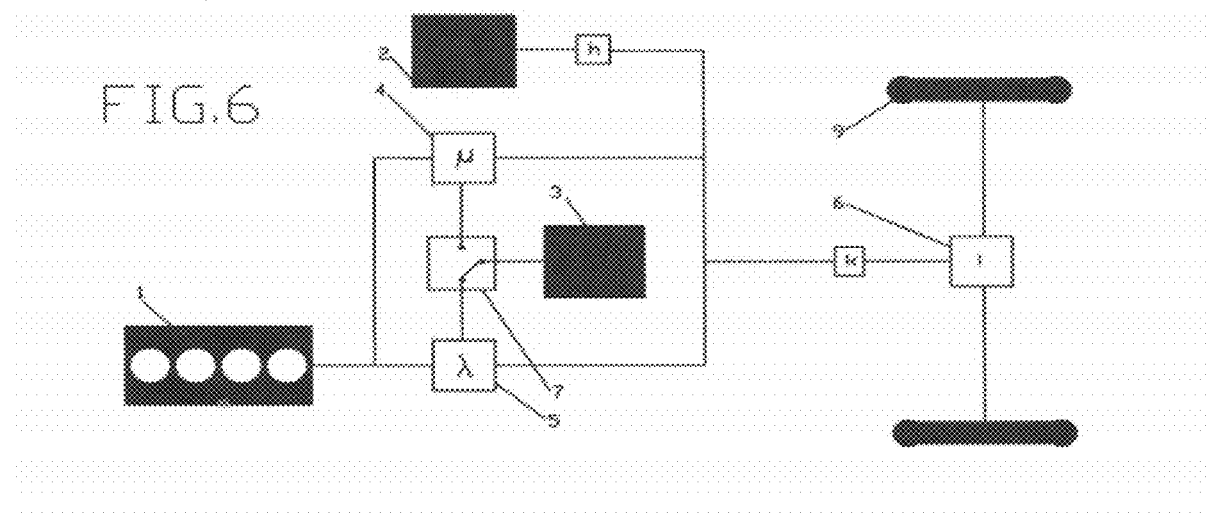
FIG. 6 schematizes the architecture of the power transmitting system of the hybrid vehicle according to the present invention in its downstream version.

FIG. 6 schematizes the architecture of the power transmitting system of the hybrid vehicle according to the present invention in its downstream version. The thermal engine (1) drive the two planetary gear mechanisms (4) and (5) which themselves with the electric motor (2) drive in parallel the axle of the wheels (9) via the differential gear (6). The pilot shafts of the two planetary gear mechanisms (4) and (5) are alternatively connected and disconnected to the generator (3) through the clutch (7). The reducer gears (h) and (k) ensure the compatibility of the rotation speeds in the power transmitting system.

Figure 7:
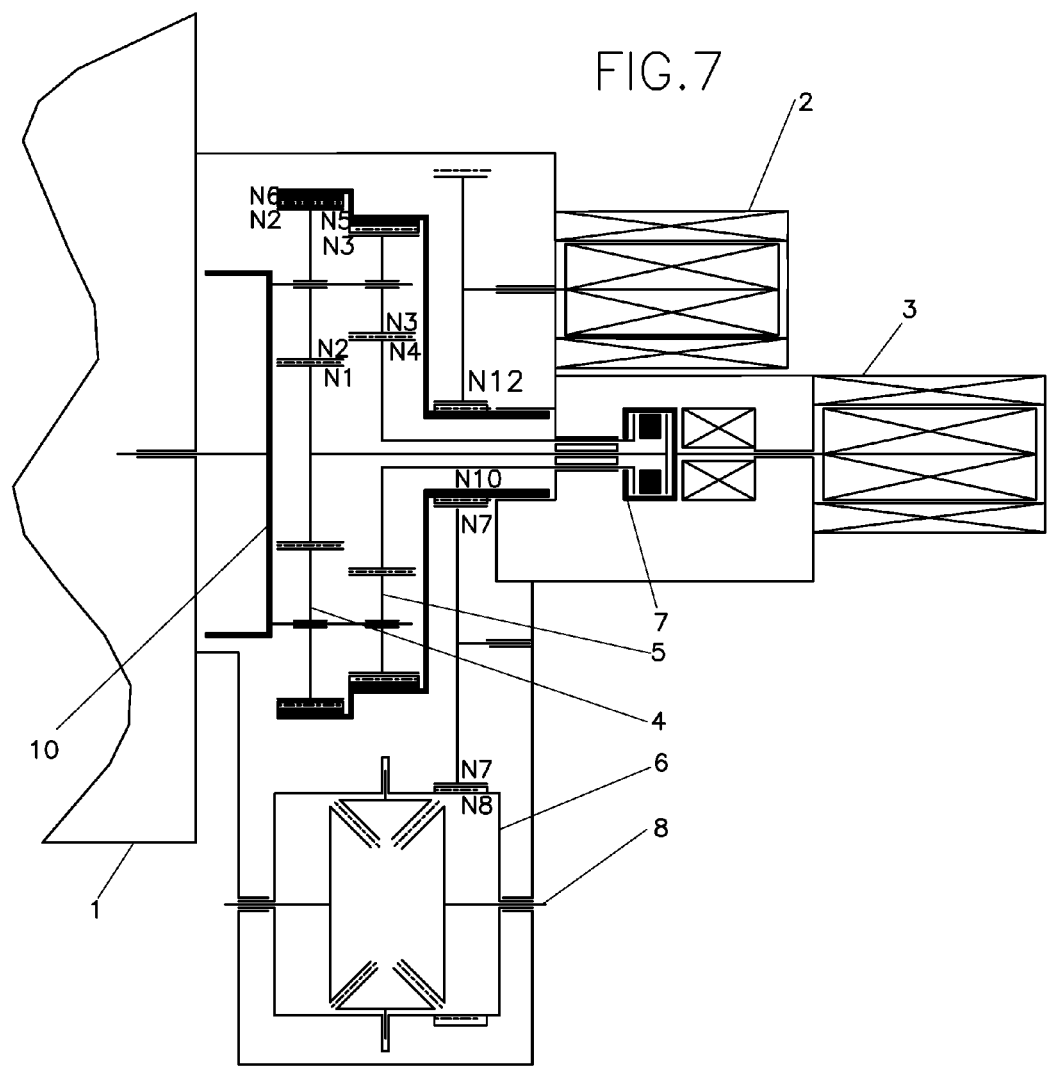
FIG. 7 shows, out of transverse section, the two planetary gear mechanisms according to the present invention in its downstream version.

FIG. 7 shows, out of transverse section, the two planetary gear mechanisms according to the present invention in its downstream version. The description is the same as FIG. 4 except that the pinion gear carrier is no longer driven by the electric motor (2). In this version, the common ring gear (N5) and (N6) is driven by the electric motor (2) through the step up gear (N10) and (N12).

The invention claimed is:

1. A power transmitting system for hybrid vehicle comprising:
    first and second planetary gear mechanisms for power derivation, each having an input shaft, an output shaft and a pilot shaft;
    the first planetary gear mechanism (5) has a gear ratio dedicated to high vehicle speeds while the second planetary gear mechanism (4) has a gear ratio dedicated to low vehicle speeds, wherein the first and second planetary gear mechanisms (4) and (5) are concentric, the input shafts are a common pinion carrier (10) and the output shafts are a common ring gear;
    an electric generator (3) with a control of resistive torque, able to absorb and to convert derived power from the first and second planetary gear mechanisms into electric power and work as a motor;
    an electric motor (2) able to absorb power from the generator and work as a generator;
    a battery able to absorb or to restitute the balance of power to the electric motor;
    an engine (1) including an engine shaft;
    the input shafts of the first and second planetary gear mechanisms are connected to the engine shaft (1) to receive power while the output shafts of the first and second planetary gear mechanisms are connected to an axle (6) for driving wheels of the vehicle:
    a clutch (7) alternatively connecting and disconnecting the pilot shafts of each of the first and second planetary gear mechanisms to a shaft of the generator.

2. The power transmitting system for hybrid vehicle of claim 1, wherein the electric motor is connected in parallel with the engine in an upstream configuration where a shaft of the electric motor is connected to the engine shaft and consequently, to the input shafts of the first and second planetary gear mechanisms.

3. The power transmitting system for hybrid vehicle of claim 1, wherein the second planetary gear mechanism (4) which is dedicated to the vehicle low speeds has a gear ratio between −0.1 and −0.5 while the first planetary gear mechanism (5) dedicated to the high vehicle speeds has a gear ratio between −0.5 and −0.9; the gear ratio being the ratio between the product of teeth numbers of the driving gears and the product of the teeth numbers of the driven gears.

4. The power transmitting system for hybrid vehicle of claim 1, wherein the pilot shafts of the first and second planetary gear mechanisms are permuted when the rotation speed of a shaft of the generator equalizes the rotation speed of the input shafts of the first and second planetary gear mechanisms.

5. The power transmitting system for hybrid vehicle of claim 1, wherein the generator regulation changes to torque regulation at low constant speed above a predetermined speed set for the characteristics of the power transmitting system.

6. The power transmitting system for hybrid vehicle of claim 1, wherein energy generated by the generator (3) contains kinetic energy coming from vehicle deceleration; the kinetic energy is stored in said battery while the remaining energy is consumed in the electric motor (2) and in vehicle auxiliaries; the stored kinetic energy is consumed later during vehicle acceleration which follows the vehicle deceleration.

7. The power transmitting system for hybrid vehicle of claim 1, wherein the battery has a reserve of capacity, which is not rechargeable by the generator (3) but which is rechargeable by an electric grid.

\* \* \* \* \*